(12) United States Patent
Cheng (10) Patent No.: US 7,404,774 B1
(45) Date of Patent: Jul. 29, 2008

(54) RULE BASED BODY MECHANICS CALCULATION

(76) Inventor: Koun-Ping Cheng, P.O. Box 9364, Rancho Sante Fe, CA (US) 92067

( * ) Notice: Subject to any disclaimer, the term of this patent is extended or adjusted under 35 U.S.C. 154(b) by 0 days.

(21) Appl. No.: 11/472,891

(22) Filed: Jun. 22, 2006

(51) Int. Cl.
*A63B 69/36* (2006.01)
(52) U.S. Cl. .................. 473/409; 473/221; 473/151; 473/209; 434/247; 434/252
(58) Field of Classification Search ............... 473/151, 473/207, 209, 216, 266, 221, 409; 434/247, 434/252, 257
See application file for complete search history.

(56) References Cited

U.S. PATENT DOCUMENTS

| | | | | |
|---|---|---|---|---|
| 4,005,261 A | * | 1/1977 | Sato et al. ............... | 348/579 |
| 4,137,566 A | * | 1/1979 | Haas et al. ............... | 473/209 |
| 4,233,631 A | * | 11/1980 | Mahler ................... | 348/579 |
| 5,249,967 A | * | 10/1993 | O'Leary et al. .......... | 434/247 |
| 5,333,061 A | | 7/1994 | Nakashima | |
| 5,823,878 A | | 10/1998 | Welch | |
| 6,793,585 B1 | | 9/2004 | Miyamoto | |
| 2004/0147330 A1 | | 7/2004 | Dimare | |

* cited by examiner

*Primary Examiner*—Nini Legesse
(74) *Attorney, Agent, or Firm*—Henneman & Associates, PLC; Larry E. Henneman, Jr.

(57) ABSTRACT

The invention is a motion training method. The motion of golf swing will be emphasized. In order to guide a golfer through a proper swing, his/her swing must be analyzed first. To analyze the swing, a set of frame photos will be needed.

From those frame photos, the invented method will provide a rule based method to calculate the body mechanics/forces of the golfer. Once the body mechanics/forces are known, the system will then determine the swing is correct or incorrect. If the swing is incorrect, the system will then make suggestions to the golfer about how to correct his/her swing.

15 Claims, 10 Drawing Sheets

A set of frame photos of a golf swing

Fig 1  A set of frame photos of a golf swing

Fig 2  Backbone coordinates

Fig 3  Upper body rotation angle

Body acceleration diagram
Stored in database

Incorrect body acceleration

Fig 4

Fig 5 Waist line

Fig 6   Swing plane normal

Fig 7  Club rotation angle

Fig. 8

Fig 9  hand (arm) line

Fig 1.0 System diagram

RULE BASED BODY MECHANICS CALCULATION

BACKGROUND ART

1. U.S. Pat. No. 5,333,061, Nakashima, et al. Method and apparatus for producing an instructional video analyzing a golf swing.
2. U.S. Pat. No. 5,823,878, Welch, Golf swing analysis apparatus and method.
3. U.S. Pat. No. 6,793,585, Miyamoto, et al. Swing measurement method, golf swing analysis method, and computer program product.
4. United States Patent Application, 20040147330, DiMare, Mark, Swing fault-correction matrix.

OTHER REFERENCES

[1]. The Everything Golf Instruction Book by Rob Blumer and Dr. Rex Chaney, Adams, 2003.
[2]. The Golf Doctor by Edward Craig, Hamlyn, 2004.

I. BACKGROUND

This invention is related to a motion training/reforming method. Using a video camera to record an action and later reviewing each frame to analyze the movement, is a common practice in many sports. For instance video a golfer's swing and analyze it later. This has already been done for many years. In fact many patents have already been issued to for methods which analyze golf swing by using video photos (see Background Art (1), (2) and (3) above).

U.S. Pat. No. 5,823,878 discloses a certain method of analyzing a golf swing by using video photos. The foundation of this method is completely based on motion capturing technology. A set of 3D-points on the golfer's body and club is captured. The (x, y, z)-coordinates of those 3D-points are calculated from at least two sets of photos taking at different angles. Then the body mechanics of the golfer are calculated by processing those captured 3D points with certain general processors.

Any motion, in general, is dominated by certain physical laws/rules. For example, a golf swing is dominated by the following two physical rules (see Other Reference [1] above), i.e. during the swing, (1) the golfer's upper body rotates around his/her backbone and
(2) the backbone is almost constantly pointing at a fixed direction.

However, these physical rules are completely ignored by U.S. Pat. No. 5,823,878. If those rules can be used in the calculation of the body mechanics, all the complicated system and processes such as motion capturing mentioned in this U.S. Pat. No. 5,823,878 will become unnecessary.

II. SUMMARY

Starting with a set of frame photos, this invented method will use a set of physical rules (including those mentioned above) and a set of 2D lines to calculate the body mechanics/forces of the golfer. Once the body mechanics/forces are known, we will have the essential information of the golfer's swing. This essential information will then provide the golfer with a clue of how to correct his/her movement.

Although the motion of golf swing is emphasized, the application of this invented method will not be limited to the golf swing.

Although this invented method can be applied to different kinds of motions, in order to make things clear we will concentrate our motion just on golf swing. A good golf swing is composed of correct body, hip, arm and club movements. The object of this invented training method is to help train a golfer to move his/her body, hip, arm and club correctly.

Using photos to help train a golfer is nothing new. However, this inventive method will take a new approach. A set of consecutive photos will be used as the input. A set of 2D lines on the player's body will be selected from the photos. The selected lines can either be the backbones (see FIG. 1), shoulder lines (see FIG. 2), waist lines or any other meaningful lines. The player's body mechanics will then be calculated from the motion of these selected lines. To make the calculation simple, a set of physical rules which dominates the motion of the swing, will be used. The advantages of adapting physical rules are:

(1) The 3D technology such as motion capturing used in calculating body mechanics (see background patent (2)) becomes unnecessary.
(2). The 3D-points construction which is needed in the classic method (see background patent (2)) will be either unnecessary or greatly reduced.

Once the body mechanics/forces are known, the system will then be able to determine whether the swing is correct or incorrect. If the swing is incorrect, the system will then make suggestions to the golfer about how to correct his/her swing.

IV. DETAILED DESCRIPTIONS (RULES-A)

During a golf swing, the golfer's body will:

(1) rotate around his/her backbone and
(2) the backbone is almost constantly pointing at a fixed direction (see [1]). The above physical rules dictate the motion of the golfer's upper body. Deduced from these rules, to obtain a golfer's upper body mechanics, we only need to calculate:

(1) the backbone positions of the golfer and
(2) the rotation angles of the body around the backbone.

Figure 1:
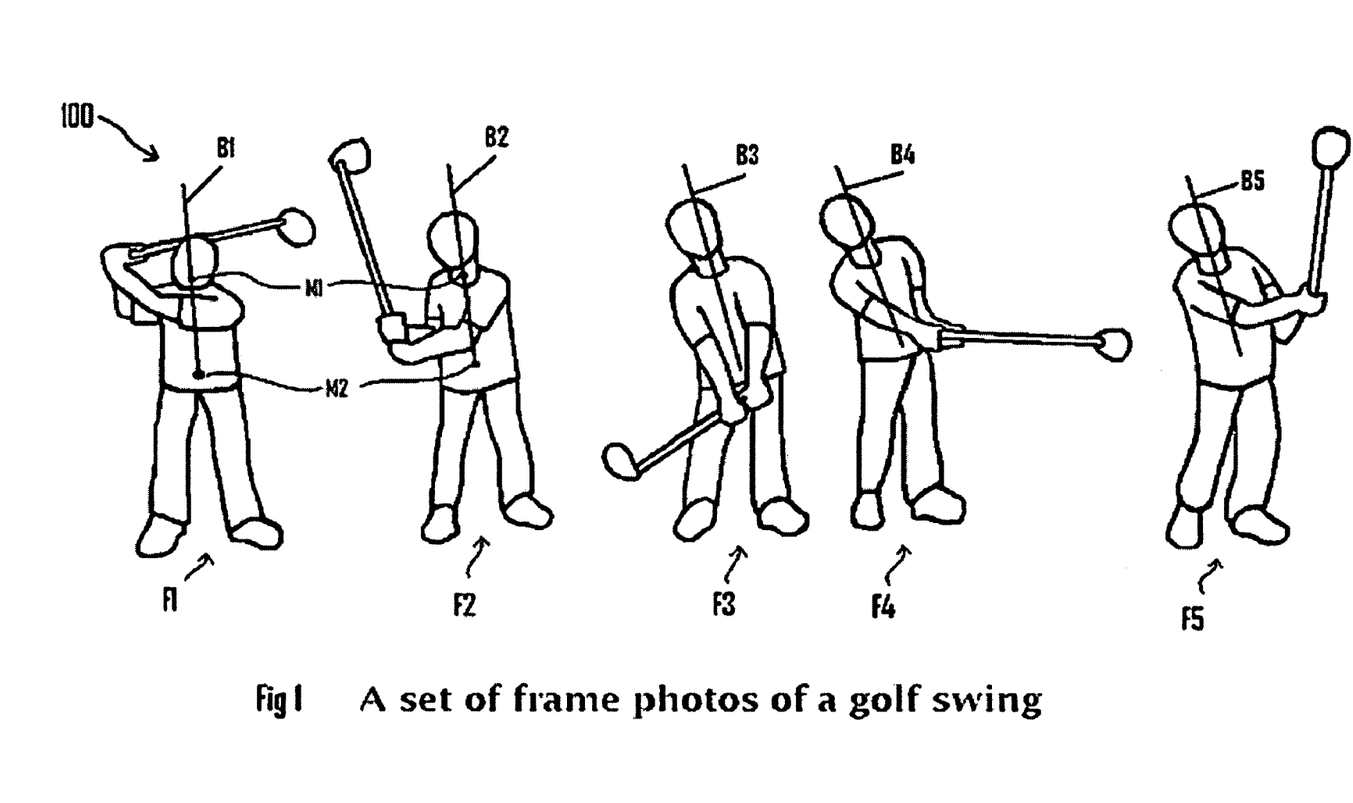
FIG. 1 contains a set of frame photos of a golf swing.
Figure 2:
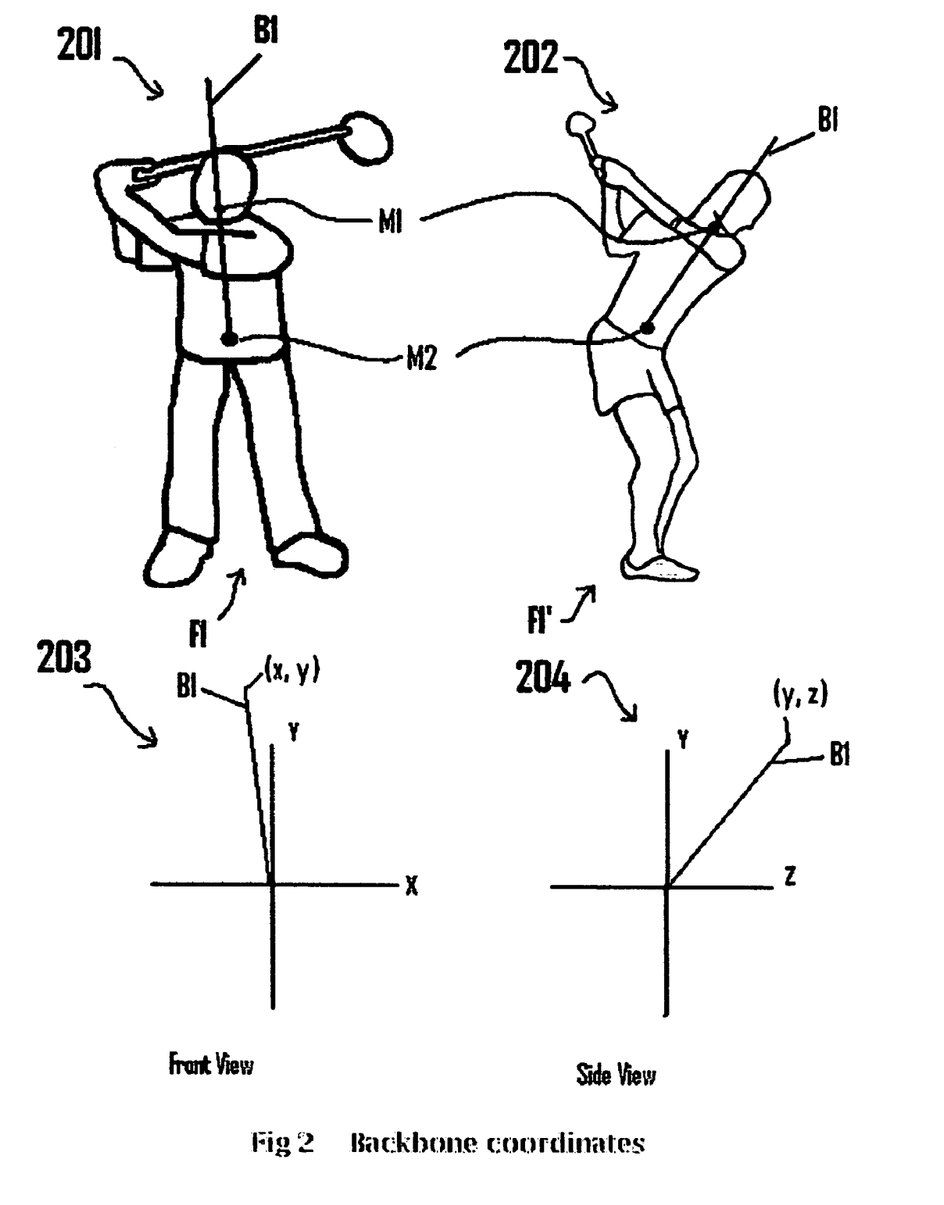
FIG. 2 is an illustration of how to obtain the (x, y, z)-coordinates of a golfer's backbone.

How to calculate the backbone positions of the player 100 is shown in FIG. 1 and FIG. 2. FIG. 1 contains a sequence of golf swing frame pictures (F1, F2, F3, F4, F5).

Two fixed locations M1 and M2 are marked on the golfer's backbone and are connected with a line (see FIG. 1). The same process is repeated for all the frames. We will then have a set of lines (B1, B2, B3 . . . ).

Note that for the reason of simplicity M1 and M2 are not drawn on all the frames.

Once we have the geometry of (B1, B2 . . . B5), the next step is to get the (x, y, z)-coordinates of (B1, B2 . . . B5). To get the (x, y, z)-coordinates we need both the front and side views. 201 and 203 of FIG. 2 shows the (x, y) components of B1. 202 and 204 of FIG. 2 shows the (y, z) components of B1. Add the z-component of (y, z) to (x, y) and we will have the (x, y, z)-coordinates of B1. Repeat the same process for all the frames and we will have all the (x, y, z)-coordinates of B1, B2 . . . B5.

Figure 3:
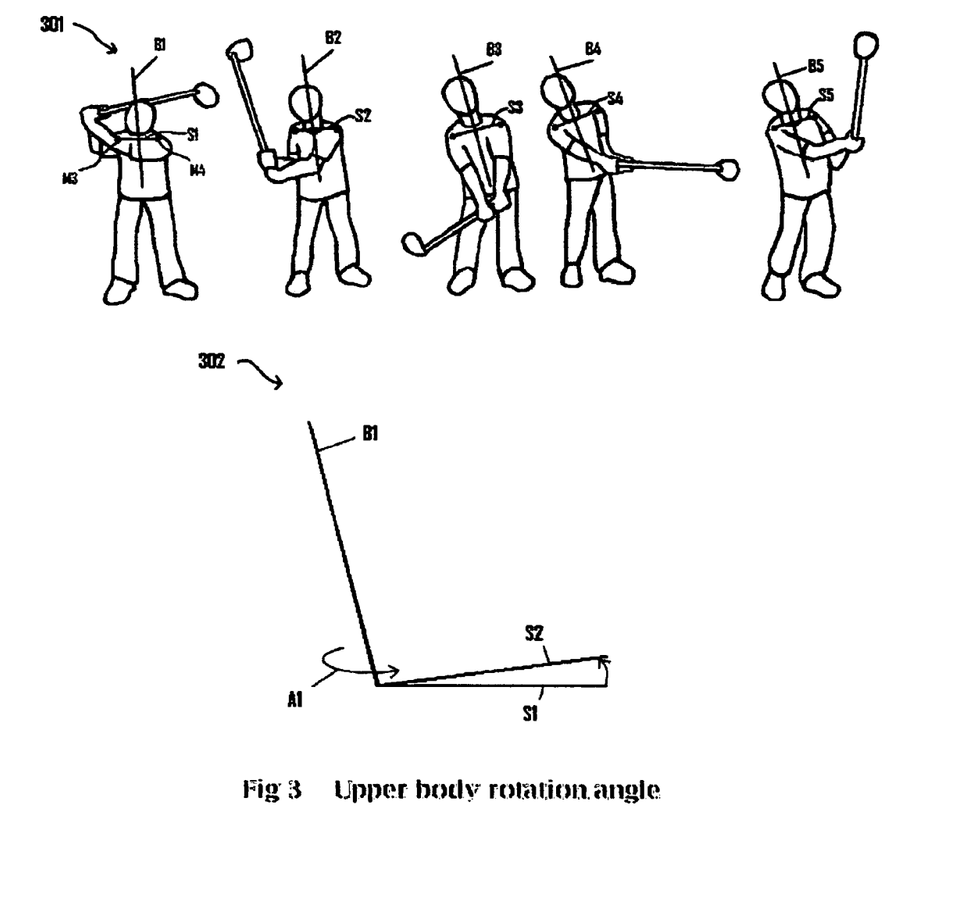
FIG. 3 shows how to calculate the rotating angle of the upper body.

With the backbone positions defined, we can now calculate the upper body rotation angles around the backbone. In 301 of FIG. 3 for each frame photo we select two fixed locations M3 and M4 on the shoulder. Connect M3 and M4 with a line. Repeat the same process for all the frames. We will then have a set of lines:

(S1, S2 . . . S5).

Let A1 be the upper body rotating angle of the first frame. Note that to calculate A1, is equivalent to calculate the rotating angle which rotates line S1 to S2 around the backbone B1 (see 302 of FIG. 3). Also note that the calculation of A1 is straight forward. There is no need to calculate the z-component of S1 and S2. We only need to treat the z-component of S1 as zero and ignore the z-component of S2. Repeat the same process for all the frames. We will then have all the angles (A1, A2 . . . A5).

Figure 4:
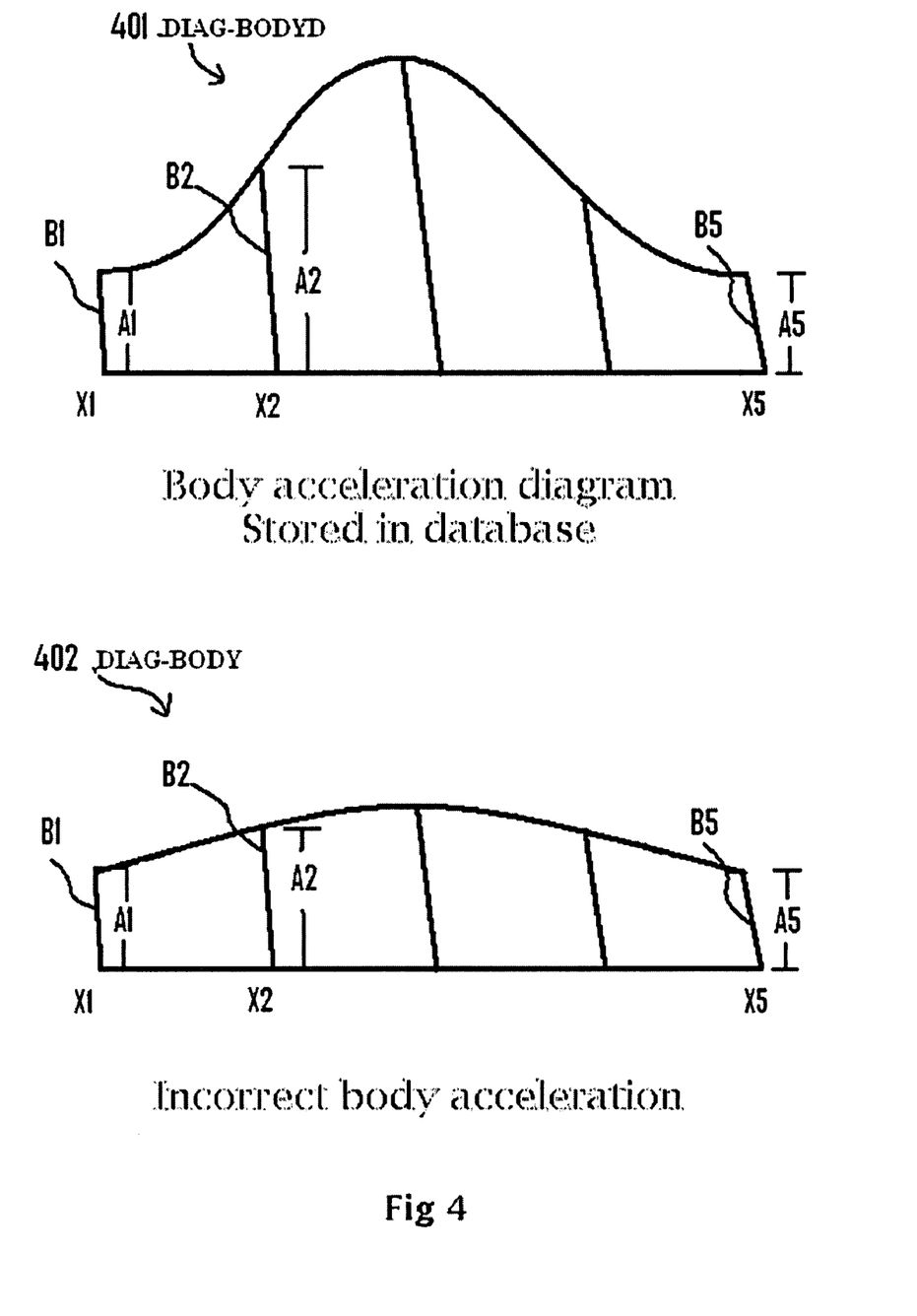
FIG. 4 displays the acceleration diagrams of the upper body.

In FIG. 4, we redraw all the backbones Bi (i=1, 2 . . . 5) by giving (1) equal distance on x-direction and (2) the length of Bi equals Ai. The diagram we obtained is called the body acceleration diagram DIAG-BODY 402 (FIG. 4) and it represents the upper body mechanics of the golfer. The upper body acceleration diagram can be used to determine if the golfer moves his/her upper body correctly. The determination is done by comparing the diagram generated by the golfer with a correct one stored in database. See DIAG-BODYD 401 (FIG. 4).

The diagram stored in database is either known as the expert knowledge or predefined conditions.

401 of FIG. 4 is a correct acceleration diagram stored in database and 402 is an incorrect acceleration diagram generated by the golfer. From the comparison of these two diagrams, the system can obviously make a suggestion to the player that he/she needs to rotate his/her upper body more during the down swing.

Same as the upper body, the hip mechanics of a golf swing (i.e. the angle that the hip rotates around the backbone) can also be calculated in the same way. The only difference is that to calculate the angles we use the waist lines (W1, W2 . . . W5)

Instead of the shoulder lines (S1, S2 . . . S5).

Figure 5:
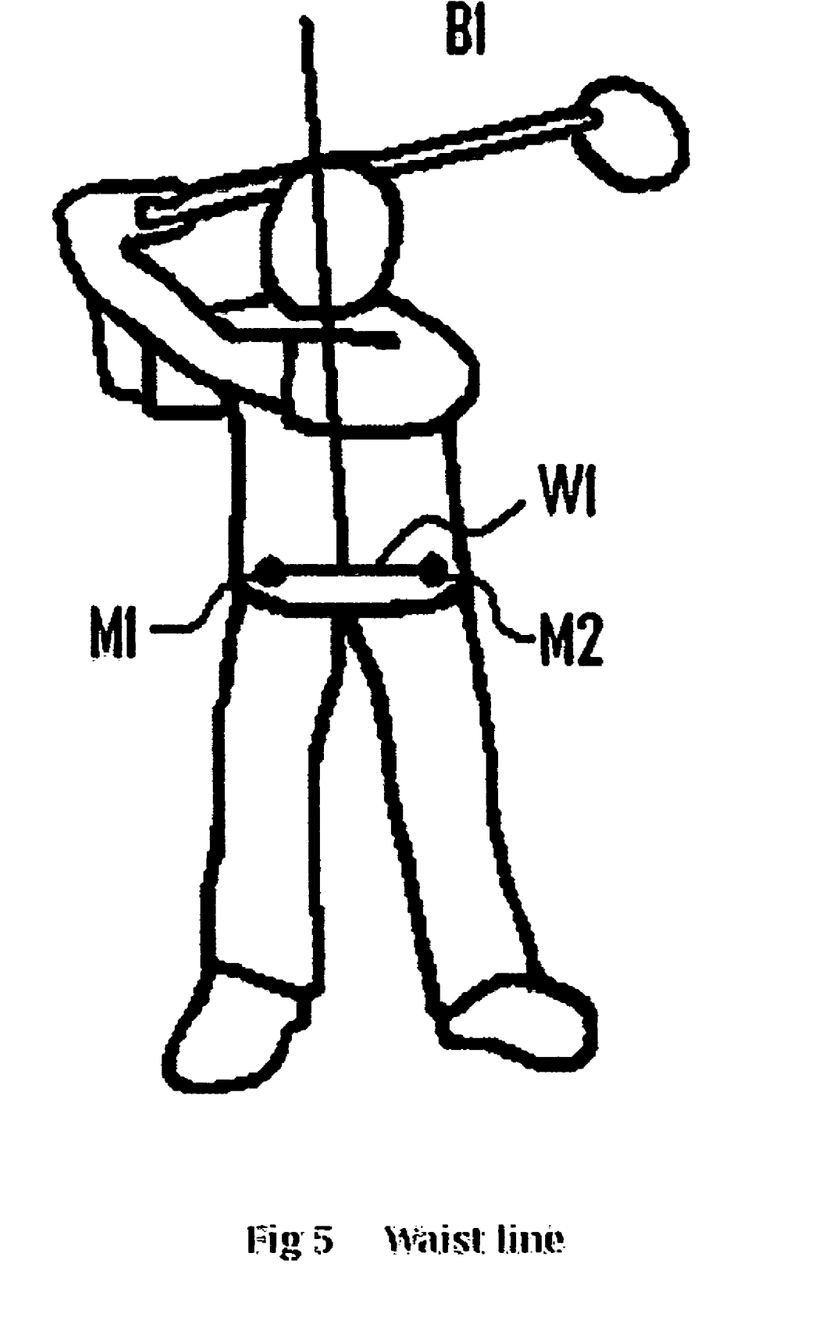
FIG. 5 is an illustration of how to construct the waist lines.

FIG. 5 shows how to construct the waist lines. Select two fixed locations M1 and M2 on the waist, and then connect M1 and M2 with a line W1. Note that only W1 is drawn in FIG. 5. For the simplicity of drawing, W2, W3 . . . W5 are not shown.

(RULES-B)
- (a) During a golf swing, the club head stays in a plane and this plane is known as the swing plane ([1]).
- (b) The golfer's hand (or arm) will also stay in a slightly different plane.

Figure 6:
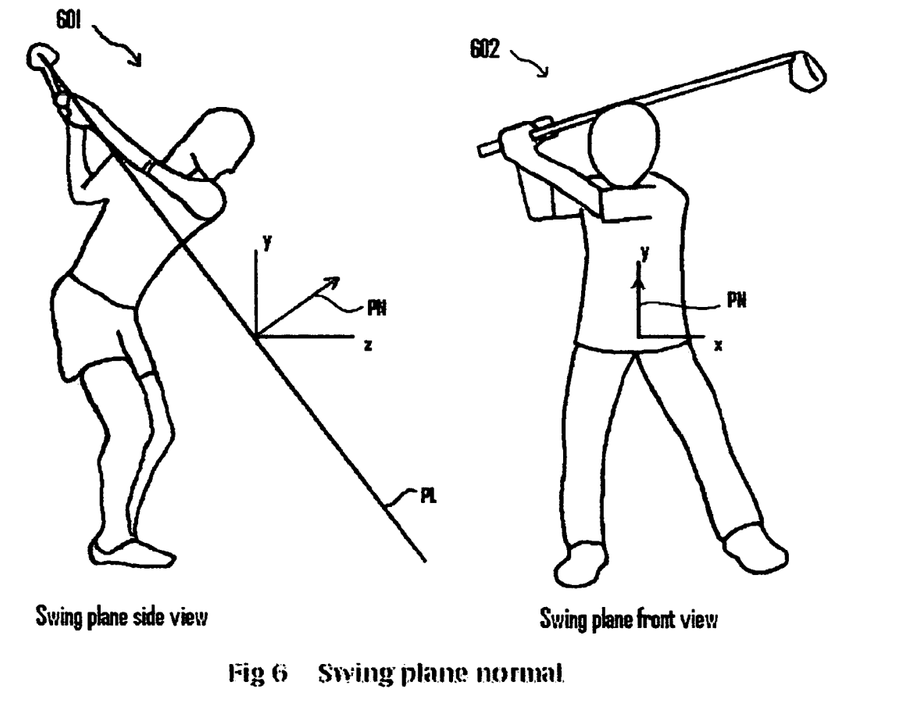
FIG. 6 is an illustration of how to obtain the (x, y, z)-coordinates of the plane normal of a swing plane.

In 601 of FIG. 6 PL is the swing plane of the club head and PN is the plane normal of PL. The (x, y z)-coordinates of PN are shown in 601 and 602 of FIG. 6.

Figure 7:
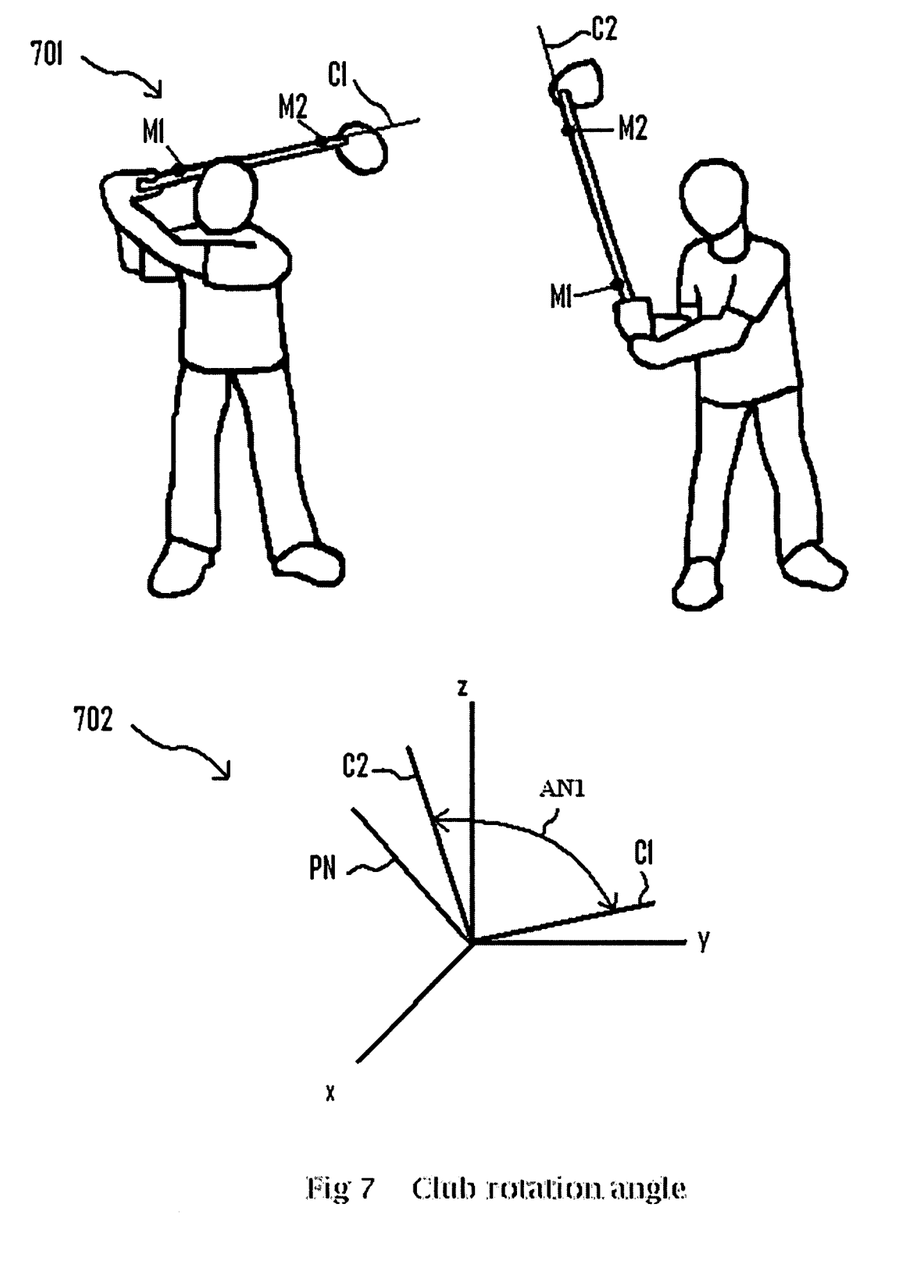
FIG. 7 shows how to calculate the rotating angle of the club.

In 701 of FIG. 7, two fixed points M1 and M2 are selected on the club. Connect M1 and M2 we will have a line. Repeat the same process and we will have a set of lines (C1, C2 . . . C5).

Note that for simplicity only C1 and C2 are drawn.

In 702 of FIG. 7, we define the angle AN1 as the rotating angle from C1 to C2 around the plane normal PN. Similar to the calculation of the said body angle A1, the calculation of AN1 is also straight forward. Repeat the same calculation and we will have all the club angles (AN1, AN2 . . . AN5).

Figure 8:
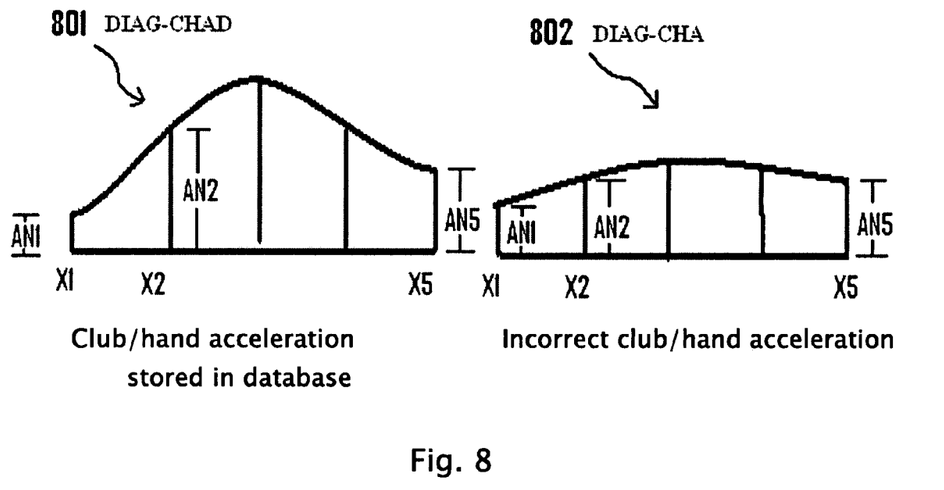
FIG. 8 displays the acceleration diagrams of the club.

In FIG. 8 we construct a diagram by giving the y-values at xi equals ANi, where i=1, 2 . . . 5. The diagram we obtained here is called the club acceleration diagram DIAG-CHA 802, shown in FIG. 8.

Similar to body acceleration, the club acceleration diagram can also be used to determine if the golfer moves his/her club correctly. The determination is done by comparing the diagram generated by the golfer with a correct one stored in database. See diagram DIAG-CHAD 801 (FIG. 8).

The diagram stored in database is either known as the expert knowledge or predefined conditions.

FIG. 8 shows a correct acceleration diagram DIAG-CHAD 801 stored in database and is an incorrect acceleration diagram DIAG-CHA 802 generated by the golfer. From the comparison of these two diagrams, once again the system can obviously make suggestion to the player that he/she needs to accelerate the club more during the down swing.

The hand (or arm) mechanics can also be calculated in the same way as the club rotation. The only differences are:
- (a) hand (or arm) rotates around a slightly different plane PL'. The plane normal PN' of PL' is very close to PN. The (x, y, z)-coordinates of PN' can also be obtained in the same way as PN.
- (b) we use hand lines
  (H1, H2 . . . H5) or arm lines
  (AM1, AM2 . . . AM5)
  Instead of club lines (C1, C2 . . . C5).

Figure 9:
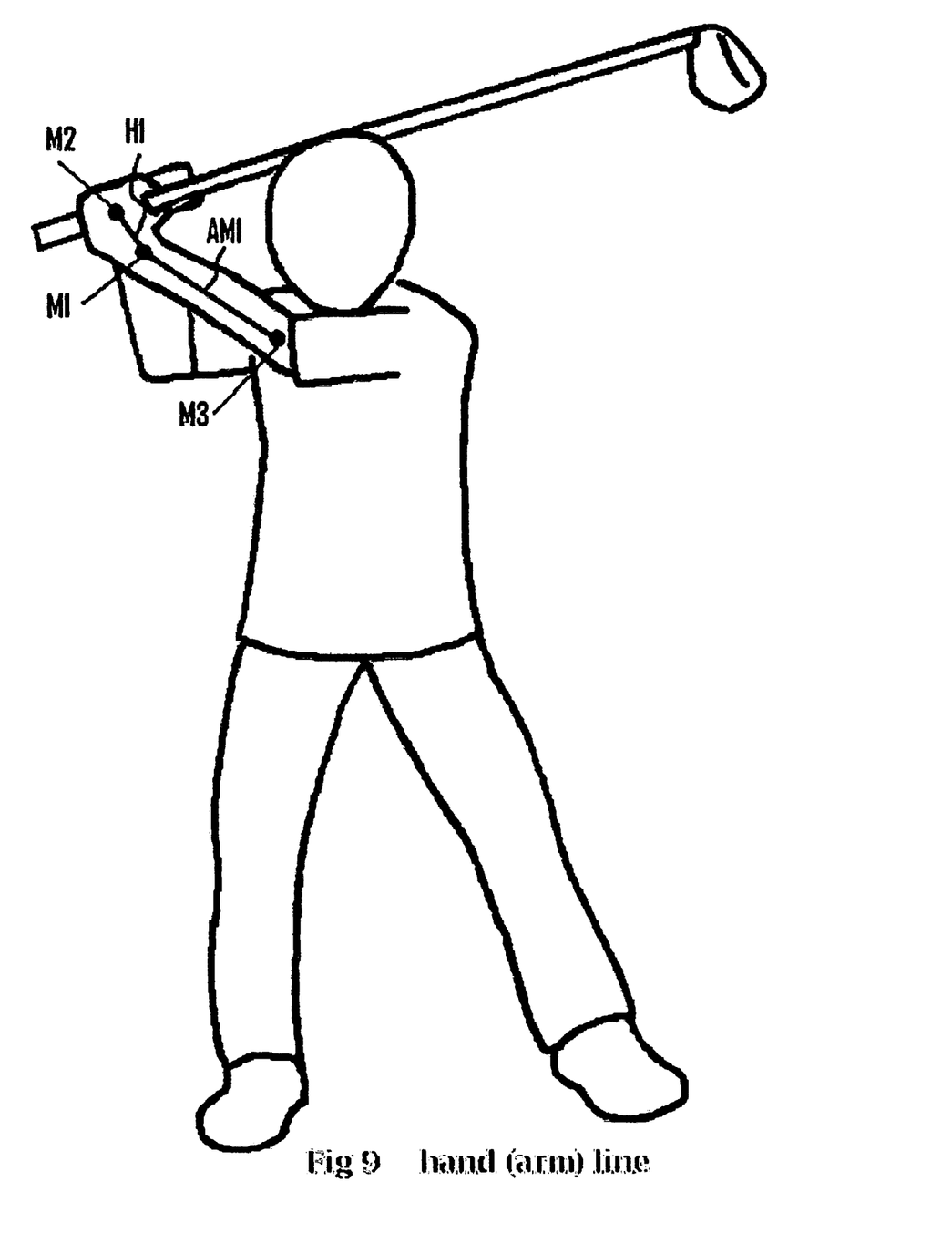
FIG. 9 is an illustration of how to construct the hand and arm lines.

FIG. 9 shows how to construct lines (H1, H2 . . . H5) and (AM1, AM2 . . . AM5). Three fixed locations M1, M2 and M3 are selected. Line H1 is constructed by connecting M1 and M2 and the line AM1 is constructed by connecting M1 and M3. Note that only H1 and AM1 are drawn in FIG. 9. For simplicity, the rest of lines are not drawn.

Similarly, once the hand (or arm) mechanics are calculated, we can also construct the hand (or arm) acceleration diagram DIAG-CHA 802 (FIG. 8). Furthermore the system can then make suggestion to the player by comparing the diagram generated by the golfer with the one stored in database. See DIAG-CHAD 801 (FIG. 8).

Once again the diagram stored in database is either known as the expert knowledge or predefined conditions.

Figure 10:
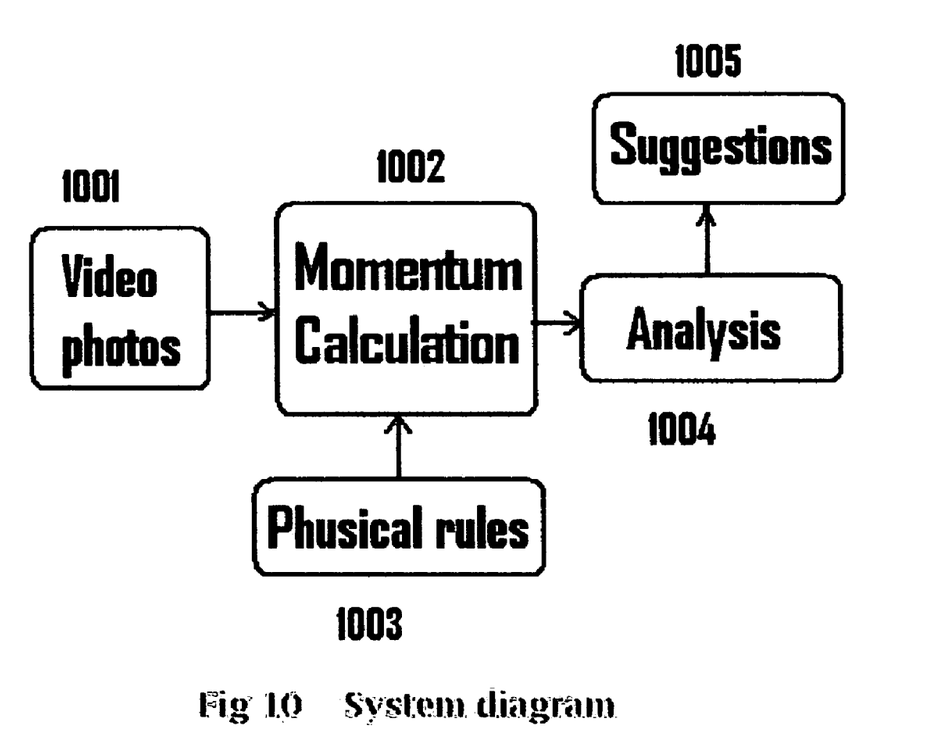
FIG. 10 is a data flow diagram of the system.

FIG. 10 shows the data flow of the system. Video photos 1001 are the input to the system. Physical rules 1002 are used for calculation. The body mechanics are calculated in 1003. The results of 1003 are passed to 1004 for swing analysis. The results of 1004 are used by 1005 to give advices to the golfer.

Note that in calculating the body mechanics of a golf swing, rules RULES-A and RULES-B are used as the foundation of the calculation. For other sports such as baseball or tennis the player's body mechanics will satisfy a different set of physical rules. To calculate the body mechanics, these different rules should be used.

I claim:

1. A method for training a person to move his/her body in a desired way, the method comprising:
- obtaining a set of physical rules associated with acceptable body motion for a particular activity;
- storing data indicative of said acceptable body motion based at least in part on said physical rules;
- obtaining from a first angle a set of sequential images of said person performing said activity;
- obtaining from a second angle different from said first angle another set of sequential images of said person performing said activity;
- obtaining from said images a set of two-dimensional lines defined by at least two points on one or more objects in said images based on said physical rules;
- calculating data indicative of body motion of said person performing said activity based on said physical rules;
- comparing said data indicative of body motion of said person performing said activity with said data indicative of acceptable body motion; and
- provide suggestions to said person based on said comparison of said data indicative of body motion of said person performing said activity with said data indicative of acceptable body motion.

2. A method according to claim 1, wherein:
one of said objects is said person; and
said at least two points are points on said person's body.

3. A method according to claim 2, wherein two of said at least two points define a line corresponding to the position of said person's spine.

4. A method according to claim 3, wherein two more points define a line associated with the shoulder position of said person.

5. A method according to claim 3, wherein two more points define a line associated with the hip position of said person.

6. A method according to claim 1, wherein two of said at least two points are points on an object held by said person.

7. A method according to claim 6, wherein said object held by said person is a golf club.

8. A method according to claim 1, wherein said first angle and said second angle are orthogonal to one another.

9. A method according to claim 1, wherein:
one of said first angle and said second angle is a front angle; and
the other of said first angle and said second angle is a side angle.

10. A method according to claim 1, wherein said rules define the rotation of said person's body around said person's spine.

11. A method according to claim 1, wherein said rules define a plane of travel for an object swung by said person.

12. A method according to claim 1, wherein said data indicative of said body motion of said person includes body acceleration data.

13. A method according to claim 1, wherein said step of calculating data indicative of body motion of said person performing said activity includes calculating rotation of a golf club.

14. A method according to claim 1, wherein said step of calculating data indicative of body motion of said person performing said activity includes calculating rotation of said person's hand.

15. A computer-readable medium have code embodied therein for causing a system to perform the steps of the method of claim 1.

* * * * *